US012664759B2

(12) United States Patent
Liang

(10) Patent No.: US 12,664,759 B2
(45) Date of Patent: Jun. 23, 2026

(54) IMAGE PROCESSING METHOD AND IMAGE PROCESSING APPARATUS

(71) Applicant: ALi Corporation, Hsinchu (TW)

(72) Inventor: Lun Liang, Guangdong (CN)

(73) Assignee: ALi Corporation, Hsinchu (TW)

( * ) Notice: Subject to any disclaimer, the term of this patent is extended or adjusted under 35 U.S.C. 154(b) by 315 days.

(21) Appl. No.: 18/492,751

(22) Filed: Oct. 23, 2023

(65) Prior Publication Data

US 2024/0331353 A1 Oct. 3, 2024

(30) Foreign Application Priority Data

Mar. 29, 2023 (CN) .......................... 202310322570.1

(51) Int. Cl.
 *G06V 10/764* (2022.01)
 *G06V 10/75* (2022.01)
(52) U.S. Cl.
 CPC .......... *G06V 10/764* (2022.01); *G06V 10/751* (2022.01)
(58) Field of Classification Search
 CPC .......................... G06V 10/764; G06V 10/751
 See application file for complete search history.

(56) References Cited

U.S. PATENT DOCUMENTS

| | | | | |
|---|---|---|---|---|
| 11,295,178 | B2* | 4/2022 | Peng ...................... | G06V 10/32 |
| 2010/0329556 | A1* | 12/2010 | Mitarai .............. | G06V 10/7715 |
| | | | | 382/224 |
| 2020/0250497 | A1* | 8/2020 | Peng ........................ | G06T 5/50 |

FOREIGN PATENT DOCUMENTS

| | | |
|---|---|---|
| CN | 111508039 | 8/2020 |
| CN | 112269465 | 1/2021 |

* cited by examiner

*Primary Examiner* — Shaghayegh Azima
(74) *Attorney, Agent, or Firm* — JCIPRNET

(57) ABSTRACT

Disclosed are an image processing method and an image processing apparatus. An original image including a plurality of pixels is obtained. The plurality of pixels include a first pixel. N target pixel coordinates are recorded. The N target pixel coordinates form M target coordinate sets. M and N are integers greater than 0. The first pixel is associated with a first target coordinate set among the M target coordinate sets by utilizing a first classification method according to an original pixel coordinate of the first pixel. The first pixel is mapped to one of the N target pixel coordinates in the first target coordinate set by utilizing a second classification method. The original pixel coordinate of the first pixel is replaced with one of the N target pixel coordinates to convert the original image into an adjusted image.

18 Claims, 5 Drawing Sheets

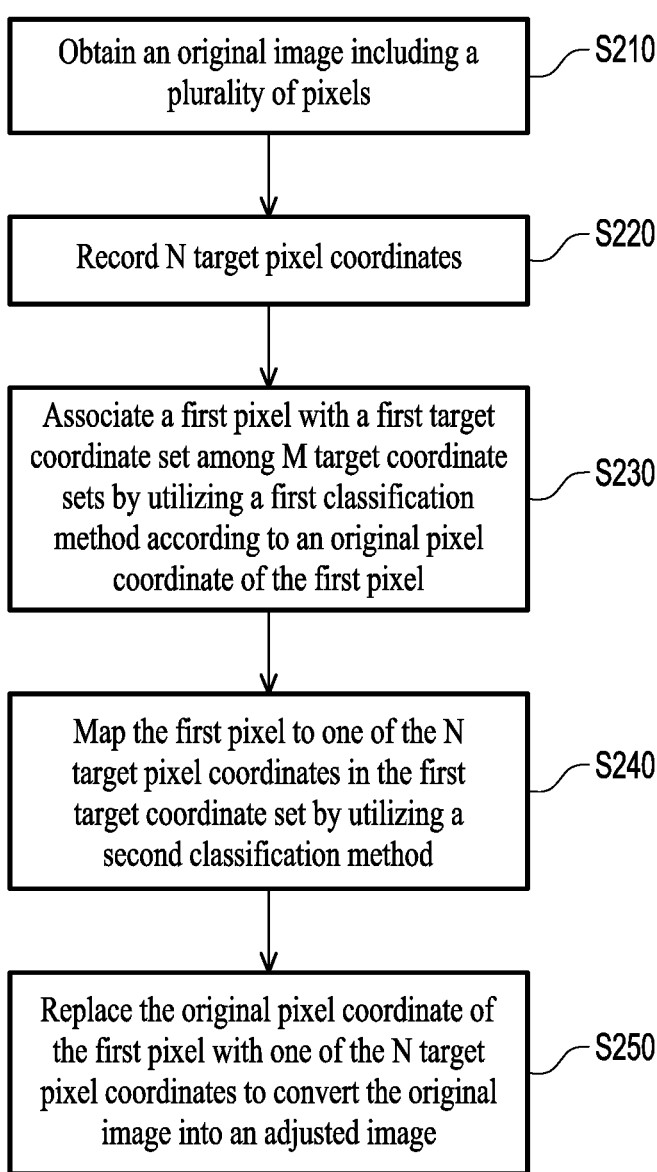

Obtain an original image including a plurality of pixels — S210

Record N target pixel coordinates — S220

Associate a first pixel with a first target coordinate set among M target coordinate sets by utilizing a first classification method according to an original pixel coordinate of the first pixel — S230

Map the first pixel to one of the N target pixel coordinates in the first target coordinate set by utilizing a second classification method — S240

Replace the original pixel coordinate of the first pixel with one of the N target pixel coordinates to convert the original image into an adjusted image — S250

Obtain a second variable threshold
corresponding to the first pixel — S241

Map the classified pixel coordinate to
one of the N target pixel coordinates in
the first target coordinate set according
to the second variable threshold — S242

IMAGE PROCESSING METHOD AND IMAGE PROCESSING APPARATUS

CROSS-REFERENCE TO RELATED APPLICATION

This application claims the priority benefit of Chinese application no. 202310322570.1, filed on Mar. 29, 2023. The entirety of the above-mentioned patent application is hereby incorporated by reference herein and made a part of this specification.

BACKGROUND

Technical Field

The disclosure relates to image processing technology. Particularly, the disclosure relates to an image processing method and an image processing apparatus.

Description of Related Art

With the advancement of science and technology, a display screen utilized to display a color image has been widely applied in people's life. The color image displayed by the display screen includes a plurality of pixels, and the pixel value of each pixel includes color channel components corresponding to different color channels. As can be known, an increase in the number of bits of these pixel values indicates an increase in the types of colors of these pixels and an increase in the chroma of the image. However, in some application scenarios, it is necessary to compromise the number of bits of the pixel value. For example, when an external device transmits the pixels of the image to the display screen through a signal transmission interface (such as SPI, i8080, or m6800), it is necessary to convert pixels with a high number of bits into pixels with a low number of bits in order to save memory or match the output format. For example, an RGB888 format with a 24-bit chroma is converted into an RGB444 format with a 12-bit chroma or a RGB565 format with a 16-bit chroma. Particularly, for an electronic device with limited memory (such as a wearable device), it is more cost-effective to slightly compromise the color performance of the image and control the number of pixel bits within a range. On the premise of reducing the number of pixel bits, how to maximally maintain the color performance of the image is a issue to be attended to by those skilled in the art.

SUMMARY

The disclosure relates to an image processing method and an image processing apparatus, in which the color displayed in an original image is substantially maintained in an adjusted image after the process of reducing pixel bits.

An embodiment of the disclosure provides an image processing method including the following. An original image including a plurality of pixels is obtained. The plurality of pixels include a first pixel. N target pixel coordinates are recorded. The N target pixel coordinates form M target coordinate sets, where M and N are integers greater than 0. The first pixel is associated with a first target coordinate set among the M target coordinate sets by utilizing a first classification method according to an original pixel coordinate of the first pixel. The first pixel is mapped to one of the N target pixel coordinates in the first target coordinate set by utilizing a second classification method.

The original pixel coordinate of the first pixel is replaced with one of the N target pixel coordinates to convert the original image into an adjusted image.

An embodiment of the disclosure provides an image processing apparatus including a storage device and a processing circuit. The storage device records N target pixel coordinates. The N target pixel coordinates form M target coordinate sets, where M and N are integers greater than 0. The processing circuit is coupled to the storage device. The processing circuit is configured to: obtain an original image including a plurality of pixels that include a first pixel; associate the first pixel with a first target coordinate set among the M target coordinate sets by utilizing a first classification method according to an original pixel coordinate of the first pixel; map the first pixel to one of the N target pixel coordinates in the first target coordinate set by utilizing a second classification method; and replace the original pixel coordinate of the first pixel with one of the N target pixel coordinates to convert the original image into an adjusted image.

Based on the foregoing, in the embodiments of the disclosure, the pixels of the original image are first associated with one of the M target coordinate sets by utilizing the first classification method, and the pixels of the original image are then associated with one of the target pixel coordinates in the one of the M target coordinate sets by utilizing the second classification method. Accordingly, the original image with a high number of bits may be converted into an adjusted image with a low number of bits, and the adjusted image includes N target pixel coordinates. On this basis, the color performance of the adjusted image can be close to the color performance of the original image after reducing the pixel bits.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a flowchart of an image processing method according to an embodiment of the disclosure.

DESCRIPTION OF THE EMBODIMENTS

Figure 1:
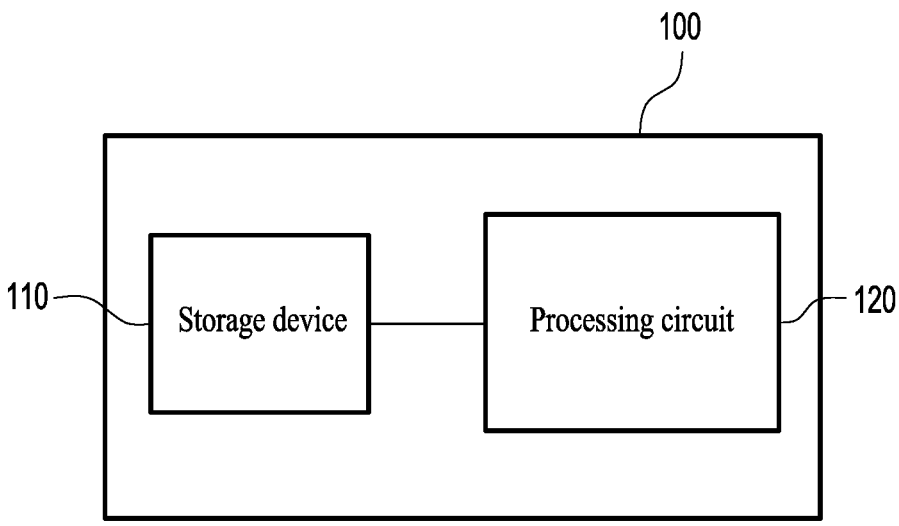
FIG. 1 is a block diagram of an image processing apparatus according to an embodiment of the disclosure.

Reference will now be made in detail to exemplary embodiments of the disclosure, examples of which are illustrated in the accompanying drawings. Wherever possible, the same reference numerals are used in the drawings and description to refer to the same or like parts.

FIG. 1 is a block diagram of an image processing apparatus according to an embodiment of the disclosure. With reference to FIG. 1, an image processing apparatus 100 includes a storage device 110 and a processing circuit 120.

The storage device 110 is configured to store data such as images, instructions, program codes, and/or software components. In a preferable embodiment, the storage device 110 may be any type of fixed or removable random access memory (RAM), read-only memory (ROM), flash memory, a hard disk drive or other similar devices, an integrated circuit, or a combination thereof, for example.

The processing circuit 120 may be a central processing unit (CPU), programmable general-purpose or special-purpose microprocessors, a digital signal processor (DSP), a programmable controller, an application specific integrated circuit (ASIC), a programmable logic device (PLD), an integrated circuit or other similar devices, or a combination of these devices. In various embodiments, relevant operations of the processing circuit 120 may be implemented as software, firmware, or hardware by utilizing common programming languages (such as C or C++), hardware description languages (such as Verilog HDL or VHDL), or other suitable programming languages. In some embodiments, the software (or firmware) may be stored in the storage device 110, so that the processing circuit 120 may access/execute the programming codes of the software (or firmware) to perform the relevant functions.

FIG. 2 is a flowchart of an image processing method according to an embodiment of the disclosure With reference to FIG. 2, the method of this embodiment is applicable to the image processing apparatus 100 of the embodiment above, and the detailed steps of this embodiment accompanied with the components in the image processing apparatus 100 will now be described below.

In step S210, the processing circuit 120 obtains an original image including a plurality of pixels, and the plurality of pixels of the original image include a first pixel. An original pixel coordinate of each pixel in the original image includes a plurality of channel components of a plurality of color channels. For example, in terms of an RGB color space, the original pixel coordinate of each pixel in the original image may include a red (R) channel component, a green (G) channel component, and a blue (B) channel component. In some embodiments, each channel component of the original pixel coordinate of each pixel may be represented by a plurality of binary bits. For example, in terms of an RGB color space, assuming that each channel component of the original pixel coordinate is represented by 8 bits, then each pixel in the original image is represented by 24 bits. In some embodiments, the aforementioned first pixel may be any one pixel in the original image.

In step S220, the storage device 110 records N target pixel coordinates. Specifically, N target pixel coordinates may be recorded in the storage device 110, so that the processing circuit 120 may convert the original image into an adjusted image including N target pixel coordinates.

In some embodiments, each pixel in the original image has P bits, and N is less than or equal to $2^P$. For example, in terms of an original image in a RGB888 format, each pixel in the original image has P=24 bits, and the number N of target pixel coordinates is less than or equal to $2^P$. In addition, in some embodiments, the N target pixel coordinates may be represented by Q bits, and Q is smaller than P. In some embodiments, 2Q is greater than or equal to N. As can be seen, the number of colors of the original image is more than the number of colors of the adjusted image, and the number of pixel bits of the original image is higher than the number of pixel bits of the adjusted image. As can be seen, the processing circuit 120 may convert the original image with a larger number of colors and a higher number of pixel bits into an adjusted image with a fewer number of colors and a lower number of pixel bits. For example, the processing circuit 120 may convert an original image including 224 types of pixels into an adjusted image including 210 types of pixels. Alternatively, the processing circuit 120 may convert an original image conforming to the RGB888 format into a 16-color adjusted image in the CLUT4 format.

It should be noted that the N target pixel coordinates may form M target coordinate sets, where M and N are integers greater than 0. Each of the M target coordinate sets includes at least two of the N target pixel coordinates. In other words, the N target pixel coordinates may be grouped into the M target coordinate sets, and each target coordinate set includes some of the N target pixel coordinates. Nonetheless, the number of target coordinate sets and the number of target pixel coordinates included therein are not limited by the disclosure, and may be designed depending on the actual applications. In some embodiments, under the RGB color coordinates, at least two target pixel coordinates in each target coordinate set are collinearly arranged.

Figure 3:
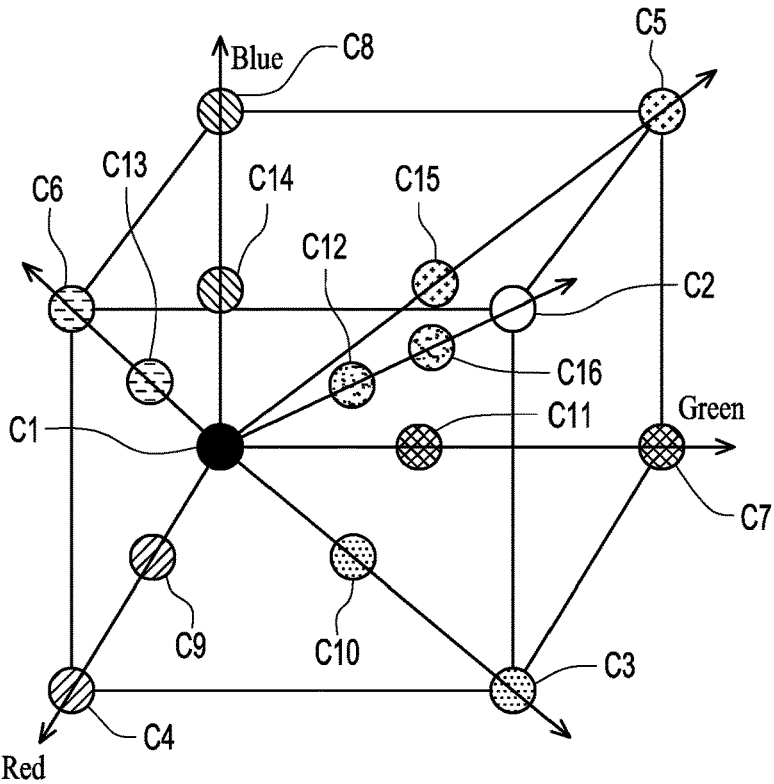
FIG. 3 is a schematic diagram of an example of M target coordinate sets and N target pixel coordinates according to an embodiment of the disclosure.

For example, FIG. 3 is a schematic diagram of an example of M target coordinate sets and N target pixel coordinates according to an embodiment of the disclosure. With reference to FIG. 3, assuming that the processing circuit 120 may convert an original image in a RGB888 format into a 16-color adjusted image in a CLUT4 format, then N=16 target pixel coordinates C1 to C16 may form M=7 target coordinate sets S1 to S7. The target coordinate set S1 includes the target pixel coordinates C1, C12, C16, and C2, which are respectively (0,0,0), (128,128,128), (192,192, 192), and (255,255,255). The target coordinate set S2 includes the target pixel coordinates C1, C9, and C4, respectively which are (0,0,0), (128,0,0), and (255,0,0). The target coordinate set S3 includes the target pixel coordinates C1, C11, and C7, which are respectively (0,0,0), (0,128,0), and (0,255,0). The target coordinate set S4 includes the target pixel coordinates C1, C14, and C8, which are respectively (0,0,0), (0,0,128), and (0,0,255). The target coordinate set S5 includes the target pixel coordinates C1, C10, and C3, which are respectively (0,0,0), (128,128,0), and (255,255,0). The target coordinate set S6 includes the target pixel coordinates C1, C13, and C6, which are respectively (0,0,0), (128,0, 128), and (255,0,255). The target coordinate set S7 includes the target pixel coordinates C1, C15, and C5, which are respectively (0,0,0), (0,128,128), and (0,255,255). Nonetheless, FIG. 3 only serves for exemplary description, and is not intended to limit the disclosure. In other embodiments, the processing circuit 120 may convert an original image conforming to the RGB888 format into an adjusted image of 32 colors, 64 colors, 128 colors, 256 colors, or other numbers of colors. Correspondingly, the number N of target pixel coordinates may be 32, 64, 128, 256, or other numerical values.

In step S230, the processing circuit 120 associates the first pixel with a first target coordinate set among the M target coordinate sets by utilizing a first classification method according to the original pixel coordinate of the first pixel. The processing circuit 120 may associate each pixel in the original image with one of the M target coordinate sets by utilizing the first classification method. In some embodiments, the processing circuit 120 may classify the first pixel into one of the M target coordinate sets according to a first dither processing. Taking the example of FIG. 3 as for description, the processing circuit 120 may classify the first pixel into one of 7 target coordinate sets.

In step S240, the processing circuit 120 maps the first pixel to one of the N target pixel coordinates in the first target coordinate set by utilizing the second classification method. The processing circuit 120 may map each pixel in the original image to one of the target pixel coordinates in the corresponding target coordinate set by utilizing the second classification method. In some embodiments, the processing circuit 120 may classify the first pixel into one of the target pixel coordinates in the first target coordinate set according to a second dither processing.

Figure 4:
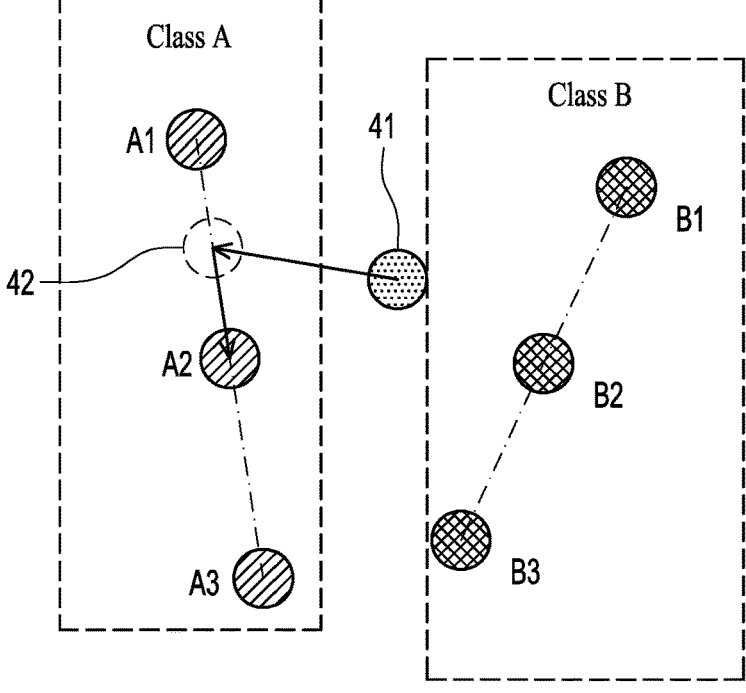
FIG. 4 is a schematic diagram of mapping pixels of an original image to one of N target pixel coordinates according to an embodiment of the disclosure.

With reference to FIG. 4, which is a schematic diagram of mapping pixels of an original image to one of N target pixel coordinates according to an embodiment of the disclosure. Two target coordinate sets, class A and class B, are taken as an example for description of FIG. 4. The target coordinate set class A includes three target pixel coordinates A1, A2, and A3, and the target coordinate set class B includes three target pixel coordinates B1, B2, and B3. The processing circuit 120 may associate an original pixel coordinate 41 of the first pixel with the target coordinate set class A via the first classification method, and obtain a classified pixel coordinate 42 corresponding to the target coordinate set class A. Next, the processing circuit 120 may map the classified pixel coordinate 42 to the target pixel coordinate A2 according to the second classification method. Alternatively, taking the example of FIG. 3 for description, after the processing circuit 120 classifies the first pixel into, for example, the target coordinate set S1 among the 7 target coordinate sets, the processing circuit 120 may map the first pixel to one of the target pixel coordinates C1, C12, C16, and C2 in the target coordinate set S1.

In step S250, the processing circuit 120 replaces the original pixel coordinate of the first pixel with one of the N target pixel coordinates to convert the original image into an adjusted image. In other words, after the processing circuit 120 determines a certain target pixel coordinate corresponding to each pixel, the processing circuit 120 may replace the original pixel coordinate of each pixel with the corresponding target pixel coordinate to generate an adjusted image with a fewer number of colors. Correspondingly, in the case that the adjusted image includes N target pixel coordinates, the processing circuit 120 may obtain the pixel bits of each pixel on the adjusted image. As can be seen, the number of pixel bits of the pixels on the adjusted image is less than the number of pixel bits of the pixels on the original image. For example, assuming that the processing circuit 120 converts an original image conforming to the RGB888 format into a 16-color adjusted image in the CLUT4 format, then the number of pixel bits of the original image is 24 and the number of pixel bits of the adjusted image is 4.

A possible implementation in which the processing circuit 120 maps the pixels of the original image to one of the N target pixel coordinates according to the original pixel coordinate will be further described below.

In some embodiments, the processing circuit 120 may first convert the original pixel coordinate of the first pixel into the classified pixel coordinate corresponding to the first target coordinate set, and then map the classified pixel coordinate to one of the N target pixel coordinates.

Figure 5:
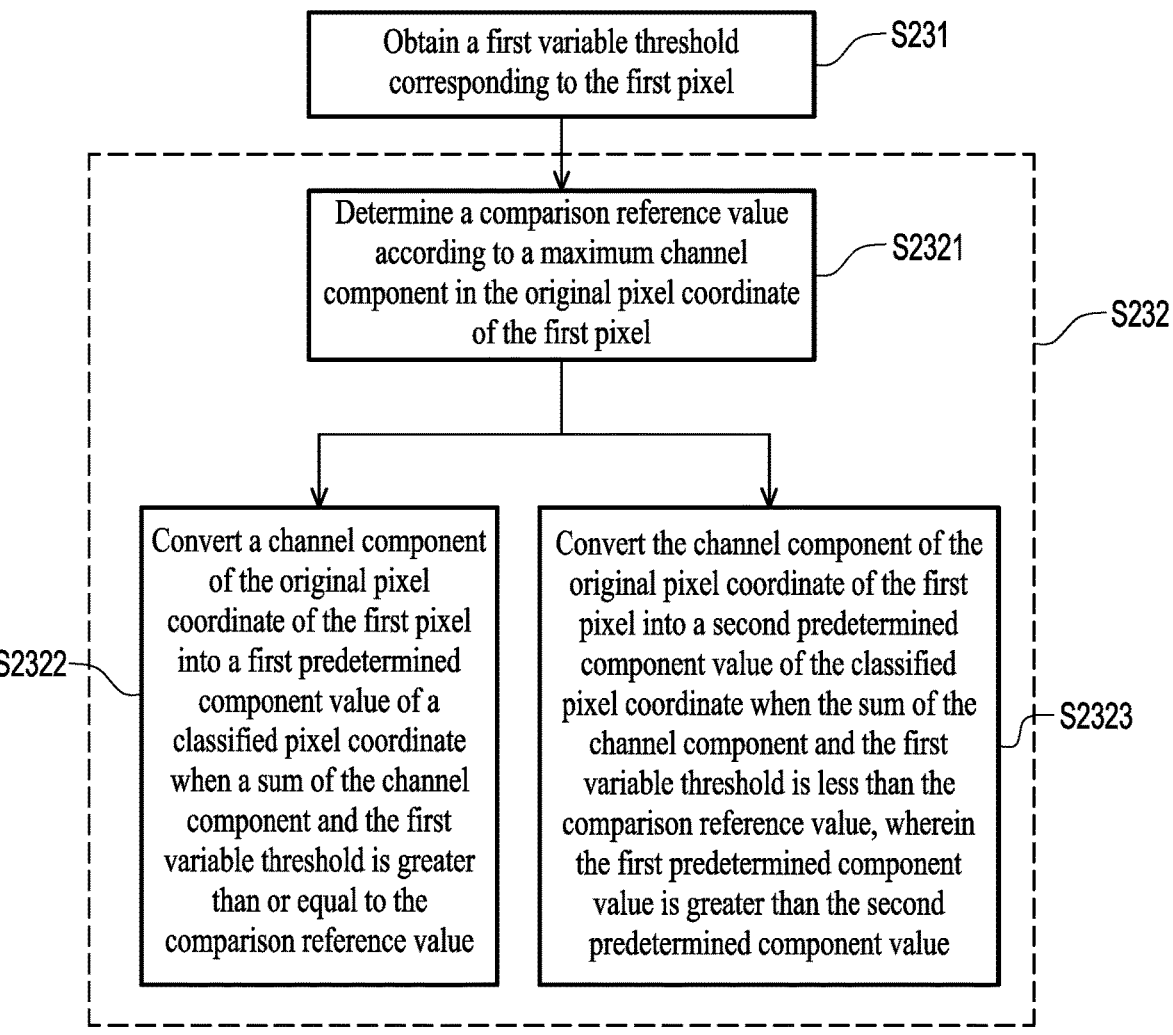
FIG. 5 is a flowchart of converting an original pixel coordinate of a first pixel into a classified pixel coordinate corresponding to a first target coordinate set according to an embodiment of the disclosure.

FIG. 5 is a flowchart of converting an original pixel coordinate of a first pixel into a classified pixel coordinate corresponding to a first target coordinate set according to an embodiment of the disclosure. With reference to FIG. 5, in step S231, the processing circuit 120 obtains a first variable threshold corresponding to the first pixel. In some embodiments, the processing circuit 120 may obtain the first variable threshold according to a dither matrix (also referred to as a threshold matrix) and a pixel position of the first pixel. To be more specific, the processing circuit 120 may determine the first variable threshold corresponding to each pixel position according to an m*m dither matrix, where m may be 2, 3, 4, or 8. The m*m dither matrix records m*m predetermined variable thresholds. By tiling a plurality of non-overlapping m*m dither matrices on the original image, each pixel position on the original image may correspond to one predetermined variable threshold. This part of operation is similar to the operation of the existing ordered dithering algorithm, and will not be repeatedly described here.

Figure 6:
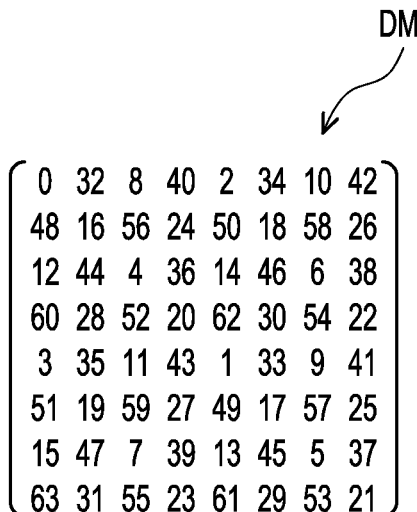
FIG. 6 is a schematic diagram of a dither matrix according to an embodiment of the disclosure.

For example, FIG. 6 is a schematic diagram of a dither matrix according to an embodiment of the disclosure. With reference to FIG. 6, the processing circuit 120 may use a 8*8 dither matrix DM1 to obtain the predetermined variable threshold corresponding to each pixel position. Here, the 8*8 dither matrix DM1 may also be referred to as a Bayer matrix. For example, a plurality of pixels on the original image correspond to the same predetermined variable threshold 0.

Next, the processing circuit 120 may calculate the first variable threshold corresponding to the first pixel according to the predetermined variable threshold corresponding to the first pixel. In some embodiments, the processing circuit 120 may multiply the predetermined variable threshold corresponding to the first pixel by a configurable coefficient coef, which is a value ranging from 2 to 4 for example, to obtain the first variable threshold corresponding to the first pixel. In this case, the first variable threshold ranges from 0 to 64*coef. Alternatively, in other embodiments, the processing circuit 120 may multiply the predetermined variable threshold corresponding to the first pixel by a maximum channel component in the original pixel coordinate of the first pixel, and then divide the product by 64 to obtain the first variable threshold corresponding to the first pixel. In this case, the first variable threshold ranges from 0 to the maximum channel component.

In step S232, the processing circuit 120 associates the first pixel with the first target coordinate set according to the first variable threshold and a comparison reference value, and converts the original pixel coordinate of the first pixel into the classified pixel coordinate corresponding to the first target coordinate set. As shown in FIG. 4, the processing circuit 120 may convert the original pixel coordinate 41 of the first pixel into the classified pixel coordinate 42 corresponding to the target coordinate set class A. To be specific, step S232 may be implemented as step S2321 to step S2323.

In step S2321, the processing circuit 120 determines the comparison reference value according to the maximum channel component in the original pixel coordinate of the first pixel. In some embodiments, the comparison reference value is the maximum channel component in the original pixel coordinate. For example, the original pixel coordinate of the first pixel is (x, y, z) and the maximum channel component is the red channel component x, that is, $x>y$ and $x>z$. In this case, the processing circuit 120 may take the red channel component x as the comparison reference value. Alternatively, in some embodiments, the comparison reference value is a predetermined value added to or subtracted from the maximum channel component in the original pixel coordinate. In some embodiments, the comparison reference value is the maximum channel component in the original pixel coordinate multiplied by a predetermined coefficient.

The predetermined value and the predetermined coefficient may be designed depending on the actual applications, and are not limited by the disclosure.

After that, the processing circuit 120 may add the corresponding first variable threshold to the other channel components that are not the maximum channel component in the original pixel coordinate. The processing circuit 120 may compare the sum of the other channel components of the original pixel coordinate of the first pixel and the first variable threshold with the comparison reference value. For example, the original pixel coordinate of the first pixel is (x, y, z) and the maximum channel component is the red channel component x, that is, x>y and x>z. The processing circuit 120 may add the first variable threshold corresponding to the first pixel to each of the green channel component y and the blue channel component z of the original pixel coordinate. Next, the processing circuit 120 may compare the sum of the green channel component y of the original pixel coordinate and the first variable threshold with the comparison reference value, and compare the sum of the blue channel component z of the original pixel coordinate and the first variable threshold with the comparison reference value.

In step S2322, the processing circuit 120 converts the channel component of the original pixel coordinate of the first pixel into a first predetermined component value of the classified pixel coordinate when the sum of the channel component and the first variable threshold is greater than or equal to the comparison reference value. In various embodiments, the first predetermined component value may be the maximum channel component or the average value of the plurality of channel components of the original pixel coordinate. For example, the original pixel coordinate of the first pixel is (x, y, z) and the maximum channel component is the red channel component x. When the sum of the green channel component y of the original pixel coordinate of the first pixel and the first variable threshold is greater than or equal to the red channel component x (i.e., the comparison reference value), the processing circuit 120 may convert the green channel component y into the maximum channel component and obtain a new green channel component x of the classified pixel coordinate. When the sum of the blue channel component z of the original pixel coordinate of the first pixel and the first variable threshold is greater than or equal to the red channel component x (i.e., the comparison reference value), the processing circuit 120 may convert the blue channel component z into the maximum channel component and obtain a new blue channel component x of the classified pixel coordinate.

In step S2323, the processing circuit 120 converts the channel component of the original pixel coordinate of the first pixel into a second predetermined component value of the classified pixel coordinate when the sum of the channel component and the first variable threshold is less than the comparison reference value. The first predetermined component value is greater than the second predetermined component value. In some embodiments, the second predetermined component value may be 0. For example, the original pixel coordinate of the first pixel is (x, y, z) and the maximum channel component is the red channel component x. When the sum of the green channel component y of the original pixel coordinate of the first pixel and the first variable threshold is less than the red channel component x (i.e., the comparison reference value), the processing circuit 120 may convert the green channel component y into zero and obtain a new green channel component 0 of the classified pixel coordinate. When the sum of the blue channel component z of the original pixel coordinate of the first pixel and the first variable threshold is less than the red channel component x (i.e., the comparison reference value), the processing circuit 120 may convert the blue channel component z into zero and obtain a new blue channel component 0 of the classified pixel coordinate.

As can be seen, based on steps S2321 to S2323, the original pixel coordinate of each pixel in the original image may be converted into a classified pixel coordinate corresponding to a certain target coordinate set. For example, assuming that the original pixel coordinate of the first pixel is (172, 183, 200) and the first variable threshold of the first pixel is 20, then the original pixel coordinate of the first pixel (172, 183, 200) may be converted into a classified pixel coordinate (0, 200, 200) according to the operations above. For example, assuming that the original pixel coordinate of the first pixel is (172, 183, 200) and the first variable threshold of the first pixel is 32, then the original pixel coordinate of the first pixel (172, 183, 200) may be converted into a classified pixel coordinate (200, 200, 200) according to the operations above. In other words, assuming that the original pixel coordinate of the first pixel is (x, y, z) and the maximum channel component is the red channel component x, then the processing circuit 120 may convert the original pixel coordinate (x, y, z) into one of classified pixel coordinates (x, x, x), (x, x, 0), (x, 0, x), (x, 0, 0). The classified pixel coordinates (x, x, x), (x, x, 0), (x, 0, x), (x, 0, 0) respectively correspond to different target coordinate sets. Taking FIG. 3 as an example for description, the classified pixel coordinate (x, x, x) corresponds to the target coordinate set S1 including the target pixel coordinates C1, C12, C16, and C2. The classified pixel coordinate (x, x, 0) corresponds to the target coordinate set S5 including the target pixel coordinates C1, C10, and C3. The classified pixel coordinate (x, 0, x) corresponds to the target coordinate set S6 including the target pixel coordinates C1, C13, and C6. The classified pixel coordinate (x, 0, 0) corresponds to the target coordinate set S2 including the target pixel coordinates C1, C9, and C4. Similarly, assuming that the original pixel coordinate of the first pixel is (x, y, z) and the maximum channel component is the green channel component y, then the processing circuit 120 may convert the original pixel coordinate (x, y, z) into one of classified pixel coordinates (y, y, y), (y, y, 0), (0, y, 0), (0, y, y). In other words, the processing circuit 120 may convert the original pixel coordinate of the first pixel into the classified pixel coordinate corresponding to the first target coordinate set through the first dither processing.

In some embodiments, the processing circuit 120 may map the classified pixel coordinate to one of the plurality of target pixel coordinates in the first target coordinate set according to the distances between the classified pixel coordinate and the plurality of target pixel coordinates in the first target coordinate set. The classified pixel coordinate may be mapped to a target pixel coordinate with the shortest distance therefrom.

Figure 7:
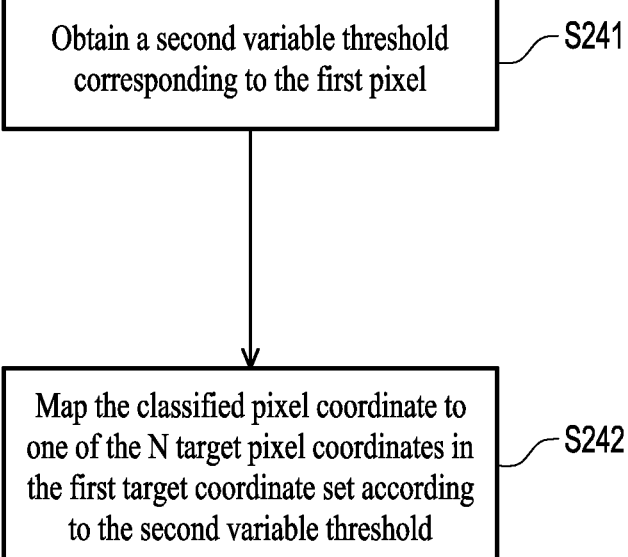
FIG. 7 is a flowchart of mapping a classified pixel coordinate to one of N target pixel coordinates according to an embodiment of the disclosure.

In some embodiments, the processing circuit 120 may map the classified pixel coordinate to one of the plurality of target pixel coordinates in the first target coordinate set through the second dither processing. FIG. 7 is a flowchart of mapping a classified pixel coordinate to one of N target pixel coordinates according to an embodiment of the disclosure. With reference to FIG. 7, in step S241, the processing circuit 120 obtains a second variable threshold corresponding to the first pixel. In some embodiments, the processing circuit 120 may obtain the second variable threshold according to a dither matrix and a pixel position of the first pixel. To be more specific, the processing circuit 120 may determine the second variable threshold corresponding to each pixel position according to an s*s dither matrix, where s may be 2, 3, 4, or 8. The s*s dither matrix records s*s predetermined variable thresholds. By tiling a plurality of non-overlapping s*s dither matrices on the original image, each pixel position on the original image may correspond to one predetermined variable threshold. Next, the processing circuit 120 may obtain the second variable threshold corresponding to the first pixel according to the predetermined variable threshold corresponding to the first pixel. This part of operation is similar to the operation of step S231 shown in FIG. 5, and will not be repeatedly described here. It should be noted that the dither matrix used in step S231 during the first dither processing may be the same with or different from the dither matrix used in step S241 during the second dither processing.

In step S242, the processing circuit 120 maps the classified pixel coordinate to one of the N target pixel coordinates in the first target coordinate set according to the second variable threshold. Specifically, the processing circuit 120 may add the second variable threshold to the first predetermined component value (e.g., the maximum channel component) of the classified pixel coordinate. After that, the processing circuit 120 may map the classified pixel coordinate to a certain target pixel coordinate in the first target coordinate set according to the sum of the first predetermined component value (e.g., the maximum channel component) of the classified pixel coordinate and the second variable threshold. The processing circuit 120 may compare the sum of the first predetermined component value (e.g., the maximum channel component) of the classified pixel coordinate and the second variable threshold with the channel component of each target pixel coordinate in the first target coordinate set, and map the classified pixel coordinate to a certain target pixel coordinate in the first target coordinate set according to the comparison result.

For example, it is assumed that the classified pixel coordinate is (x, 0, 0) and the target pixel coordinates in the first target coordinate set are respectively (0, 0, 0), (128, 0, 0), and (255, 0, 0). When the sum of a first predetermined component value x of the classified pixel coordinate and the second variable threshold is less than 128, the processing circuit 120 maps the classified pixel coordinate to the target pixel coordinate (0, 0, 0) in the first target coordinate set. When the sum of the first predetermined component value x of the classified pixel coordinate and the second variable threshold is greater than or equal to 128 and less than 255, the processing circuit 120 maps the classified pixel coordinate to the target pixel coordinate (128, 0, 0) in the first target coordinate set. When the sum of the first predetermined component value x of the classified pixel coordinate and the second variable threshold is greater than or equal to 255, the processing circuit 120 maps the classified pixel coordinate to the target pixel coordinate (255, 0, 0) in the first target coordinate set.

In summary of the foregoing, in the embodiments of the disclosure, an adjusted image including N target pixel coordinates may be generated by mapping the plurality of pixels of the original image to the N target pixel coordinates. After one or two times of dither processing, the plurality of pixels of the original image may be mapped to the N target pixel coordinates. Accordingly, in the embodiments of the disclosure, the original image with a high number of bits may be may adjusted to be an adjusted image with a low number of bits, saving image transmission bandwidth and adapting to an electronic device with limited memory, and the color performance of the adjusted image can be good and close to the original image.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing method comprising:
obtaining an original image comprising a plurality of pixels, wherein the plurality of pixels comprise a first pixel;
recording N target pixel coordinates, wherein the N target pixel coordinates form M target coordinate sets, where M and N are integers greater than 0;
associating the first pixel with a first target coordinate set among the M target coordinate sets by utilizing a first classification method according to an original pixel coordinate of the first pixel;
mapping the first pixel to one of the N target pixel coordinates in the first target coordinate set by utilizing a second classification method; and
replacing the original pixel coordinate of the first pixel with one of the N target pixel coordinates to convert the original image into an adjusted image with N colors, to convert the original image with a high number of pixel bits into the adjusted image with a low number of pixel bits, wherein number of pixel bits of the original image is greater than the number of pixel bits of the adjusted image,
wherein N is the number of colors of the adjusted image.

2. The image processing method according to claim 1, wherein each of the plurality of pixels has P bits, and N is less than or equal to $2^P$.

3. The image processing method according to claim 1, wherein each of the M target coordinate sets comprises at least two of the N target pixel coordinates.

4. The image processing method according to claim 1, wherein associating the first pixel with the first target coordinate set among the M target coordinate sets by utilizing the first classification method according to the original pixel coordinate of the first pixel comprises:
obtaining a first variable threshold corresponding to the first pixel; and
associating the first pixel with the first target coordinate set according to the first variable threshold and a comparison reference value, and converting the original pixel coordinate of the first pixel into a classified pixel coordinate corresponding to the first target coordinate set.

5. The image processing method according to claim 4, wherein associating the first pixel with the first target coordinate set among the M target coordinate sets by utilizing the first classification method according to the original pixel coordinate of the first pixel further comprises:
determining the comparison reference value according to a maximum channel component in the original pixel coordinate of the first pixel.

6. The image processing method according to claim 4, wherein obtaining the first variable threshold corresponding to the first pixel comprises:
obtaining the first variable threshold according to a dither matrix and a pixel position of the first pixel.

7. The image processing method according to claim 4, wherein associating the first pixel with the first target coordinate set according to the first variable threshold and the comparison reference value, and converting the original pixel coordinate of the first pixel into the classified pixel coordinate corresponding to the first target coordinate set comprises:

converting a channel component of the original pixel coordinate of the first pixel into a first predetermined component value of the classified pixel coordinate when a sum of the channel component and the first variable threshold is greater than or equal to the comparison reference value; and converting the channel component of the original pixel coordinate of the first pixel into a second predetermined component value of the classified pixel coordinate when the sum of the channel component and the first variable threshold is less than the comparison reference value, wherein the first predetermined component value is greater than the second predetermined component value.

8. The image processing method according to claim 4, wherein mapping the first pixel to one of the N target pixel coordinates in the first target coordinate set by utilizing the second classification method comprises:

obtaining a second variable threshold corresponding to the first pixel; and mapping the classified pixel coordinate to one of the N target pixel coordinates in the first target coordinate set according to the second variable threshold.

9. The image processing method according to claim 8, wherein obtaining the second variable threshold corresponding to the first pixel comprises:

obtaining the second variable threshold according to a dither matrix and a pixel position of the first pixel.

10. An image processing apparatus comprising:

a storage device recording N target pixel coordinates, wherein the N target pixel coordinates form M target coordinate sets, where M and N are integers greater than 0; and a processing circuit coupled to the storage device, the processing circuit being configured to:

obtain an original image comprising a plurality of pixels, wherein the plurality of pixels comprise a first pixel;

associate the first pixel with a first target coordinate set among the M target coordinate sets by utilizing a first classification method according to an original pixel coordinate of the first pixel;

map the first pixel to one of the N target pixel coordinates in the first target coordinate set by utilizing a second classification method; and replace the original pixel coordinate of the first pixel with one of the N target pixel coordinates to convert the original image into an adjusted image with N colors, to convert the original image with a high number of pixel bits into the adjusted image with a low number of pixel bits, wherein number of pixel bits of the original image is greater than the number of pixel bits of the adjusted image, wherein N is the number of colors of the adjusted image.

11. The image processing apparatus according to claim 10, wherein each of the plurality of pixels has P bits, and N is less than or equal to $2^P$.

12. The image processing apparatus according to claim 10, wherein each of the M target coordinate sets comprises at least two of the N target pixel coordinates.

13. The image processing apparatus according to claim 10, wherein the processing circuit is configured to:

obtain a first variable threshold corresponding to the first pixel; and associate the first pixel with the first target coordinate set according to the first variable threshold and a comparison reference value, and convert the original pixel coordinate of the first pixel into a classified pixel coordinate corresponding to the first target coordinate set.

14. The image processing apparatus according to claim 13, wherein the processing circuit is configured to:

determine the comparison reference value according to a maximum channel component in the original pixel coordinate of the first pixel.

15. The image processing apparatus according to claim 13, wherein the processing circuit is configured to:

obtain the first variable threshold according to a dither matrix and a pixel position of the first pixel.

16. The image processing apparatus according to claim 13, wherein the processing circuit is configured to:

convert a channel component of the original pixel coordinate of the first pixel into a first predetermined component value of the classified pixel coordinate when a sum of the channel component and the first variable threshold is greater than or equal to the comparison reference value; and convert the channel component of the original pixel coordinate of the first pixel into a second predetermined component value of the classified pixel coordinate when the sum of the channel component and the first variable threshold is less than the comparison reference value, wherein the first predetermined component value is greater than the second predetermined component value.

17. The image processing apparatus according to claim 13, wherein the processing circuit is configured to:

obtain a second variable threshold corresponding to the first pixel; and map the classified pixel coordinate to one of the N target pixel coordinates in the first target coordinate set according to the second variable threshold.

18. The image processing apparatus according to claim 17, wherein the processing circuit is configured to:

obtain the second variable threshold according to a dither matrix and a pixel position of the first pixel.

* * * * *